3,219,606
BLENDS OF SHELLAC WITH INTERPOLYMERS OF UNSATURATED CARBOXYLIC AMIDES AND ETHYLENICALLY UNSATURATED COMPOUNDS
Conrad L. Lynch, Cranford, N.J., assignor to Pittsburgh Plate Glass Company, Pittsburgh, Pa., a corporation of Pennsylvania
No Drawing. Filed Oct. 31, 1960, Ser. No. 65,907
7 Claims. (Cl. 260—27)

This invention relates to new coating compositions, and pertains more particularly to coating compositions comprised of shellac and an aldehyde-modified carboxylic acid amide interpolymer.

In a copending application, Serial No. 749,583, filed July 21, 1958, now U.S. Patent No. 3,037,963, there is disclosed a process for producing useful resinous products from unsaturated carboxylic acid amides such as acrylamide or methacrylamide. The process disclosed in said copending application involves forming an interpolymer of such unsaturated carboxylic acid amides with at least one other polymerizable ethylenically unsaturated monomer, and then reacting said interpolymer with an aldehyde such as formaldehyde in the presence of an alcohol such as butanol. The resulting resins range from soft, flexible materials to very hard solids, depending upon the choice of monomers utilized in preparing the amide interpolymer which in turn is reacted with the aldehyde and the alcohol.

It has now been found that new and useful resinous compositions and blends can be obtained by blending at least about 20 percent of the aldehyde-modified acrylamide copolymer with shellac. It has long been known that shellac, which is of a natural origin (a secretion of the lac bug (*Laccifer lacca*) of India) has unique and unusual properties; no other resin or chemical compound duplicates its qualities. Its main use is as a sealer for the surfaces of wood or other sensitive surface. It has very good water resistance and is particularly resistant to non-polar solvents such as benzene, toluene and xylene. By blending with shellac at least about 20 percent of the above-mentioned amide interpolymers, the shellac composition takes on thermosetting properties, flexibility, and better color holding than shellac itself. In certain instances, these blends become very good primers because of their detergent or chemical resistance.

It has also been found that shellac, when utilized as a minor constituent with the above-mentioned amide interpolymers, lowers the cure temperature and enhances the water resistance and non-polar solvent resistance in the cured interpolymer coating. These blends have been found to be fairly compatible in all proportions.

In the preparation of the aldehyde-modified amide interpolymer resin a polymerizable unsaturated carboxylic acid amide is polymerized with one or more ethylenically unsaturated monomers, and the resulting interpolymer reacted with an aldehyde. The exact mechanism whereby the amide interpolymers are obtained is not definitely known, but is believed to begin by the formation initially of a relatively short chain soluble interpolymer having an approximate structure as follows, acrylamide being utilized for illustrative purposes:

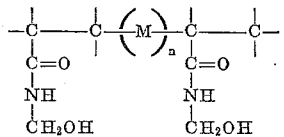

wherein M represents a unit of a monomer polymerizable with acrylamide, and $n$ represents a whole number greater than 1. For example, if styrene were utilized as the second monomer, M would represent the unit

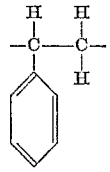

The short chain interpolymer then reacts with an aldehyde, as represented by formaldehyde, to give the structure

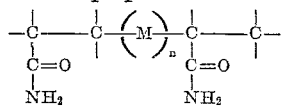

wherein M and $n$ have the significance set forth hereinabove.

In the event the aldehyde is utilized in the form of a solution in butanol or other alkanol, etherification will take place so that at least some of the methylol groups in the above structure will be converted to groups of the structure

wherein R is selected from the group consisting of a saturated lower aliphatic hydrocarbon radical having its free valences on a single carbon atom, and hydrogen, and $R_1$ is selected from the class consisting of hydrogen and the radical derived by removing the hydroxyl group from the alkanol.

It is desirable that at least about 50 percent of the methylol groups be etherified since compositions having less than about 50 percent of the methylol groups etherified will tend to be unstable and subject to gelation. Butanol is the preferred alcohol for use in the etherification process, although any alcohol, such as methanol, ethanol, propanol, pentanol, octanol, decanol, and other alkanols containing up to about 20 carbon atoms may also be employed as may aromatic alcohols, such as benzyl alcohol, or cyclic alcohols.

While either acrylamide or methacrylamide is preferred for use in forming the interpolymer component, any unsaturated carboxylic acid amide can be employed. Such other amides include itaconic acid diamide, alphaethyl acrylamide, crotonamide, fumaric acid diamide, maleic acid diamide, and other amides of alpha, beta-ethylenically unsaturated carboxylic acids containing up to about 10 carbon atoms. Maleuric acid, and esters thereof, and imide derivatives such as N-carbamyl maleimide may also be utilized.

Any polymerizable monomeric compound containing at least one $CH_2=C<$ group may be polymerized with the unsaturated carboxylic acid amide. Examples of such monomers include the following:

(1) Monoolefinic and diolefinic hydrocarbons, that is, monomers containing only atoms of hydrogen and carbon, such as styrene, alpha-methyl styrene, alpha-ethyl styrene, alpha-butyl styrene, isobutylene (2-methyl propene-1), 2-methyl-propene-1, 2-methyl-butene-1, 2-methyl-pentene-1, 2,3-dimethyl-butene-1, 2,3-dimethyl-pentene-1, 2,4-dimethyl-pentene-1, 2,3,3-trimethyl-butene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3-trimethyl-pentene-1, 2,3,4 - trimethyl - pentene-1, 2,4,4 - trimethyl-pentene-1, 2 - methyl - octene-1, 2,6-dimethyl-heptene-1, 2,6 - dimethyl-octene-1, 2,3 - dimethyl-decene-1, 2-methylnonadecene-1, ethylene, propylene, butylene, amylene, hexylene, butadiene-1,3, isoprene, and the like;

(2) Halogenated monoolefinic and diolefinic hydrocarbons, that is, monomers containing carbon, hydrogen and one or more halogen atoms such as alpha-chlorostyrene, alpha - bromostyrene, 2,5 - dichlorostyrene, 2,5 - dibromostyrene, 3,4 - dichlorostyrene, 3,4 - difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5 - trichlorostyrene, dichloromonofluorostyrenes, 2-chloropropene, 2-chlorobutene, 2-chloropentene, 2-chlorohexene, 2 - chloroheptene, 2 - bromobutene, 2-bromoheptene, 2-fluorohexene, 2-fluorobutene, 2-iodopropene, 2-iodopentene, 4-bromoheptene, 4-chloroheptene, 4-fluoroheptene, cis and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-fluoroethylene, 1,1-diiodoethylene, 1,1,2,2-tetrafluoroethylene, 1,1,2,2-tetrachloroethylene, 1-chloro-2,2,2 - trifluoroethylene, chlorobutadiene and other halogenated diolefinic compounds;

(3) Esters of organic and inorganic acids such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl-o-chlorobenzoate, vinyl m-chlorobenzoate and similar vinyl halobenzoates, vinyl - p - methoxybenzoate, vinyl-o-methoxybenzoate, vinyl-p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate, and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethyl-hexoate, allyl benzoate, allyl acrylate, allyl crotonate, allyl oleate, allyl chloroacetate, allyl trichloroacetate, allyl chloropropionate, allyl chlorovalerate, allyl lactate, allyl pyravate, allyl aminoacetate, allyl acetoacetate, allyl thioacetate, as well as methallyl esters corresponding to the above allyl esters as well as esters from such alkenyl alcohols as beta-ethyl allyl alcohol, beta-propyl allyl alcohols, 1-buten-4-ol, 2-methyl-buten-ol-4, 2(2,2-dimethylpropyl)-1-buten-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alph-cyano acrylate;

Dimethyl maleate, diethyl maleate, diallyl maleate, dimethyl fumarate, diethyl fumarate, dimethallyl fumarate and diethyl glutaconate;

(4) Organic nitriles such as acrylonitrile, methacrylonitrile, ethacrylonitrile, 3-octenenitrile, crotonitrile, oleonitrile, and the like;

(5) Acid monomers, such as acrylic acid, methacrylic acid, crotonic acid, 3-butenoic acid, angelic acid, tiglic acid, and the like.

It is to be understood that the above polymerizable olefinic monomers are representative only, and do not include all of the $CH_2=C<$ containing monomers which may be employed.

Preferably, the interpolymer should contain from about 2 percent to about 50 percent by weight of the unsaturated carboxylic acid amide component, the balance being the other ethylenically unsaturated monomer(s). It has been found that those interpolymers containing the higher levels of the amide component with those monomers which ordinarily form hard polymers, give hard and flexible films, whereas interpolymers containing lower levels of the amide component with those monomers which ordinarily form soft homopolymers tend to be considerably softer. If more than one ethylenically unsaturated monomer is polymerized with the amide, the proportions of such additional monomers utilized will depend upon the characteristics which the monomer or monomers will impart to the final interpolymer.

The preparation of the amide interpolymer is described in detail in U.S. Patents 2,870,116 and 2,870,117, the disclosure of which is incorporated herein by reference.

In carrying out the polymerization reaction, a peroxygen type catalyst is ordinarily utilized. Useful catalysts for this purpose include acetyl benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secured desired conversions.

The diazo compounds, such as p-methoxyphenyl diazothio-(2-naphthyl) ether, may also be used as polymerization catalysts in the preparation of amide interpolymers. Redox catalysts systems can also be employed.

The quantity of catalyst employed can be varied considerably; however, in most instances it is desirable to utilize from about 0.1 percent to 2.0 percent. If high viscosities are desired, a low initial level of catalyst, followed by the necessary additions to get 100 percent conversion, is preferably employed. For low viscosity interpolymers the bulk of the catalyst is added initially and later additions used only to secure desired conversions. Larger amounts of catalyst added initially give lower viscosities.

Since it is desirable that the interpolymers of acrylamide with other ethylenically unsaturated monomers be relatively low in molecular weight so that they can be dissolved at high solids and low viscosities, a chain modifying agent or chain terminator is ordinarily added to the polymerization mixture. The use of a lower alkanol, such as butanol or a mixture of butanol and water as a solvent, together with high catalyst levels, aids considerably, but in most instances it is preferred to add controlled amounts of chain modifying materials. The mercaptans, such as dodecyl mercaptan, tertiary dodocyl mercaptan, octyl mercaptan, hexyl mercaptan, and the like are conventionally used for this purpose. However, other chain modifying agents of "short stopping" agents, such as cyclopentadiene, allyl acetate, allylcarbamate, alpha-methyl styrene, alpha-methyl styrene dimers, and the like can be used to secure low molecular weights, as can unsaturated fatty acids or esters.

The polymerization is best carried out by admixing the acrylamide, or other polymerizable amide, and the other monomer or monomers, the catalyst and chain modifying agent, if any, in the solvent, and refluxing the resulting solution for a time sufficient to obtain the desired conversion. Ordinarily, the polymerization will be complete in about 1 to 16 hours. As indicated hereinabove, it may in some instances be desirable to add only a portion of the catalyst initially, the remainder being added in increments as the polymerization progresses. External cooling of the polymerization mixture or very accurate control of reflux conditions is important in carrying out the polymerization of the very rapid reaction rate and because the reaction is highly exothermic. Some control of the heat of reaction is obtained by adding the acrylamide to the polymerization mixture incrementally. Good agitation is also desirable.

The amide interpolymer resin prepared according to the disclosures in the above-identified patents is reacted with an aldehyde, preferably in the presence of an alcohol. Formaldehyde, in solution in water (formalin) or in an alkanol such as butanol, or a formaldehyde-yielding substance such as paraformaldehyde, trioxymethylene, or hexamethylenetetraamine is greatly preferred. However, other aldehydes including acetaldehyde, butyraldehyde, furfural, and the like, preferably containing only atoms of carbon, hydrogen and oxygen, can be used. Dialdehydes such as glyoxal are preferably not employed, since they tend to cause the amide interpolymer resin to gel.

It is ordinarily preferred to utilize two equivalents of formaldehyde for each amide group present in the interpolymer, although this amount may be in considerable excess of the amount necessary to form methylol groups on the polymer chain. Accordingly, this ratio may be raised or lowered considerably if desired. For example, the ratio may be as high as 3.0 equivalents of formaldehyde for each amide group in the interpolymer, or as low as about 0.2 equivalent of formaldehyde for each amide group in the interpolymer.

The reaction is preferably carried out in the presence of a mild acid catalyst such as maleic anhydride. Other acid catalysts such as oxalic acid, hydrochloric acid, or sulfuric acid may also be employed, although there is some possibility of gelation occurring if the acid catalyst is too strongly acidic. Alkaline catalysts such as sodium hydroxide, potassium hydroxide, hexamethylenetetraamine, and other basic amines may also be utilized. The quantity of catalyst utilized may be varied widely; for example, as pointed out hereinabove, the more acidic the reaction medium, the greater amount of etherification will occur.

The reaction of the amide interpolymer with the aldehyde can be carried out simply by adding the aldehyde and the catalyst (if one is utilized) to the polymerization mixture obtained by polymerizing the amide and one or more ethylenically unsaturated monomers and refluxing the resulting mixture for a period of from about 3 to about 5 hours until the desired viscosity is obtained. The water of condensation can be removed by azeotropic distillation as may a portion of the solvent if desired. In fact, when the aldehyde is utilized in the form of a solution in an alkanol such as butanol, it is desirable that approximately half of the butanol be distilled off at the end of the reaction period and replaced by another solvent such as xylol. It is preferred that the final resinous material have a solids content of about 20 percent to 70 percent.

Similar polymeric materials may also be obtained by first reacting the amide with an aldehyde such as formaldehyde to obtain an alkylolamide, for example, a methylolamide, and then polymerizing the methylolamide with one or more of the ethylenically unsaturated monomeric materials disclosed hereinabove. The polymerization utilizing a methylolamide is carried out in substantially the same manner as when the amide is interpolymerized with one or more monomers.

The polymeric materials may be prepared by still another route; namely, by polymerizing N-alkoxyalkyl amides, for example, N-butoxymethyl acrylamide, with one or more of the $CH_2=C<$ monomers set forth hereinabove. This method, described in copending application, Serial No. 775,380, filed November 21, 1958, now U.S. Patent No. 3,079,434, does not require reaction of the polymer with an aldehyde since the N-alkoxyalkyl amide monomores already contain —ROH or —$ROR_1$ groups, wherein R and $R_1$ have the meaning set forth above.

Regardless of the method by which the resinous material is obtained, it will contain in the polymer chain recurrent groups of the structure

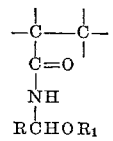

wherein R is hydrogen or a lower aliphatic hydrocarbon radical, and $R_1$ is hydrogen or the radical derived by removing the hydroxyl group from an alcohol. Thus, when the reaction is carried out in the presence of an alcohol, the alcohol reacts so that at least some, and preferably more than about 50 percent of the radicals $R_1$ will represent the radical derived from the alcohol. When the aldehyde is utilized alone, that is, not in an alcohol solution, the radical $R_1$, of course, will represent hydrogen. The free valences in the above structure may be satisfied with either hydrogen or hydrocarbon depending upon the amide which is utilized in the interpolymerization reaction.

There is no criticality in the form of shellac or shellac solution which is employed in the blends of the instant invention. Thie highly purified pure-white shellac, which is made from bleached white shellac gum, and the crude orange-flake shellac gum per se may both be utilized. Shellac is normally sold in alcoholic solutions of different concentrations ranging from 5 parts of alcohol to 3 parts shellac to 4 parts of alcohol to 1 part shellac. Most widely sold is shellac which consists of 4 to 5 pounds shellac to each gallon of pure alcohol. These mixtures are called a four-pound cut or a five-pound cut respectively, according to commercial practice; a six-pound cut would be six pounds shellac to one gallon of alcohol. In blending these mixtures with acrylamide interpolymers of the present invention, the proper solvent system is based on the presence of the alcohol of the shellac solutions.

The following examples are given by way of illustration and not by way of limitation. All parts and percentages are by weight unless otherwise specified.

*Example I*

The following is an example of a preparation of an acrylamide interpolymer:

| | Parts by weight |
|---|---|
| Acrylamide | 37.5 |
| Styrene | 206.3 |
| Methacrylic acid | 6.25 |
| Butanol | 125 |
| Toluene | 125 |

This mixture was refluxed in the presence of 7.5 parts cumene hydroperoxide and 5 parts tertiary dodecyl mercaptan for two hours, after which was added 79.4 parts butyl Formcel and 1 part maleic acid. Reaction mass was then refluxed for another three hours, cooled to about 125° and filtered. The resinous product is then blended with 31 parts Epon 1001 (epoxide equivalent 450–525) and 31 parts toluene. The final resinous product contains 48 percent to 52 percent solids, which are comprised of 10 percent Epon 1001 and 90 percent acrylamide interpolymer. Viscosity R–T.

Example II

An acrylamide interpolymer was prepared from the following proponents in the amounts set forth:

| | Parts by weight |
|---|---|
| Acrylamide | 90 |
| Styrene | 231 |
| Ethyl acrylate | 264 |
| Methacrylic acid | 15 |
| n-Butanol | 300 |
| Toluene | 300 |

The above components were mixed in a solution and refluxed in the presence of 9 parts cumene hydroperoxide and 9 parts tertiary dodecyl mercaptan for 2 hours at 210 to 215° C., after which were added 3 parts cumene hydroperoxide. The mixture was then refluxed for three successive 2-hour periods, after each of which were added 3 parts cumene hydroperoxide. After the second reflux period, 190.5 parts butyl Formcel and 2.6 parts maleic anhydride were also added. During the last two reflux periods, formed water of reaction was removed by azeotropic distillation. The product was then cooled to about 175° C. and was blended with 10 percent by weight of an epoxy resin (epoxide equivalent 450–425 based on the weight of the total mixture). This blend was stirred until it was homogeneous and then cooled. The total solids was 50 percent.

Example III

A pigment paste was made up as follows:

| | Parts by weight |
|---|---|
| Interpolymer resin of Example II | 216 |
| Xylene | 450 |
| Titanium dioxide pigment (rutile) | 2250 |

The above ingredients were ground in a pebble mill for 18 hours using standard No. 7 pebbles. Six hundred (600) more parts of the product of Example II were added as hold-out to the mill. This mixture was then ground for another hour to effect homogenization.

Example IV

| | Parts by weight |
|---|---|
| Pigment paste of Example III | 1,406.4 |
| Product of Example II | 1,641.6 |
| Silicone solution (Linde X12) | 6.0 |
| Pine oil | 31.6 |
| Xylene | 162.4 |

The above ingredients were mixed until a homogeneous paint was acquired.

Examples V to VIII

| | Parts by Weight | | | |
|---|---|---|---|---|
| Product of Example I | 50 | 100 | 150 | 180 |
| French white shellac (6 pound cut) | 159.5 | 106 | 53.2 | 21.3 |

The above compositions were mixed and reduced to spray viscosities with ethanol (23 to 26 seconds No. 4 Ford cup) and vacuum cup sprayed onto 4 inch by 12 inch steel panels that had been treated with Bonderite 1000 process. The film thickness when dry ranged between 0.5 and 1.0 mil. Individual panels of each sample were flashed for ½ hour or baked for 30 minutes at 300° F. These steel panels containing the primer coat were then coated with the composition of Example IV and baked for 30 minutes at 350° F. All of the samples were fully cured, clear and they had good adhesion and flexibility.

Example IX

Fifteen (15) parts acrylamide and 85 parts vinyl toluene were admixed with a solvent comprising 46.5 parts butanol and 46.5 parts toluene and containing 1 part cumene hydroperoxide and 1 part tertiary dodecyl mercaptan. This mixture was then refluxed for two 2 hour periods after each of which was added 0.5 part cumene hydroperoxide. After the last reflux period 31.5 parts of butyl Formcel and 0.25 part maleic anhydride were added to the cumene hydroperoxide and the mixture was azeotropically distilled for 3 hours to remove the formed water. The resinous product was filtered and cooled. Results:

| | |
|---|---|
| Solids (percent) | 48–52 |
| Viscosity (Gardner-Holdt) | X–Z |

Example X

In accordance with this example an interpolymerizable mixture was prepared:

| | Parts by weight |
|---|---|
| Acrylamide | 10 |
| Ethyl acrylate | 65 |
| Styrene | 25 |
| Butanol | 50 |
| Aromatic hydrocarbon solvents, B.P. range 185–200° C. | 50 |

The above solution was refluxed at a temperature range of from about 225° F. to 237° F. for two hours in the presence of 2 parts cumene hydroperoxide. One part more of cumene hydroperoxide was then added after three successive reflux intervals of two hours. After the fourth two hour reflux interval 1 part cumene hydroperoxide and 21 parts butyl Formcel and 0.3 part of maleic anhydride was added to the mixture whach was azeotropically distilled for three hours to remove the formed water. The mixture was then cooled to 175° F. The resulting resinous composition had a solids content of 48.7 percent, color 1 to 2, weight per gallon 8.05 pounds, and viscosity (Gardner-Holdt) X+.

Example XI

An acrylamide interpolymer was prepared from the following components in the amounts set forth:

| | Parts by weight |
|---|---|
| Acrylamide | 15 |
| Styrene | 40 |
| Ethyl acrylate | 45 |
| n-Butanol | 9.3 |
| Toluene | 9.3 |

The above components were mixed in a solution and refluxed in the presence of 1 part cumene hydroperoxide and 1 part tertiary dodecyl mercaptan. This mixture was then refluxed for two successive 2 hour periods, after each of which was added 0.5 part cumene hydroperoxide. After the last reflux period 31.5 parts butyl Formcel and 0.25 part maleic anhydride with the cumene hydroperoxide and the mixture was azeotropically distilled for 3 hours to remove the formed water of reaction. Forty six and five-tenths (46.5) parts of n-butanol was then removed by distillation and 46.5 parts of toluene were added to the mixture or resinous composition. The resinous product was filtered and cooled. Results:

| | |
|---|---|
| Solids (percent) | 48–52 |
| Viscosity (Gardner-Holdt) | U–W |
| Weight per gallon | 8.0 |
| Color | 5 maximum |

Example XII

The products of Examples IX, X and XI were cut to 30 percent solids with isopropyl alcohol and blended with a 30 percent solution of shellac in alcohol, in 1 to 3, 1 to 1, and 3 to 1 proportions. These resinous mixtures were then drawn down with a 3 mil bar on electrolytic tin plate (E.T.P.) and baked for 10 minutes at 350° F. The resulting clear films were free from fracture and had good adhesion.

*Example XIII*

Two hundred six and three-tenths (206.3) parts of styrene, 37.5 parts of acrylamide and 6.25 parts of methacrylic acid were admixed with 2.5 parts of tertiary dodecyl mercaptan (chain transfer agent), 125 parts of butanol, 125 parts of toluene, and 2.5 parts of cumene hydroperoxide. The resulting mixture was refluxed for two hours, after which an additional 1.25 parts of cumene hydroperoxide were added. Refluxing was then continued for a further period of two hours, at which time a final addition of 1.25 pounds of cumene hydroperoxide was made and refluxing continued until a conversion of substantially 100 percent was obtained. The resulting product was then admixied with 79.4 pounds of a 40 percent solution of formaldehyde in butanol and 1 pound of maleic anhydride catalyst. The resulting mixture was then refluxed under azeotropic conditions for three hours to remove water of reaction. The resinous product had the following properties:

| | |
|---|---|
| Solids (percent) | 48–52 |
| Weight per gallon (pounds) | 8.07 |
| Viscosity (Gardner-Holdt) | V–Y |
| Color (Gardner) | Under 7 |
| Acid value | 5.5 to 7.5 |

*Example XIV*

The panels of phosphatized steel (Bonderite 1000) were sprayed, one with the product of Example XIV, one with shellac and one with a blend containing 66.6 parts of the product of Example XIV and 33.3 parts of shellac. The panels were then baked for thirty minutes at 250° F. The samples coated with the product of example XIV and the shellac alone contained an aromatic solvent soluble coating which indicated that the film was not fully cured while the sample coated with the blend was insoluble when in contact with aromatic solvents.

I claim:
1. A resinous coating composition consisting essentially of
   (1) at least 20 percent of an interpolymer of (a) from about 2 percent to about 50 percent by weight of a polymerizable unsaturated carboxylic acid amide selected from the group consisting of acrylamide, methacrylamide, itaconic acid diamide, alpha-ethyl acrylamide, crotonamide, fumaric acid diamide, maleuric acid and N-carbamyl maleimide, and (b) at least one other amide-free monomer containing a $CH_2=C<$ group, said terpolymer being characterized by at least about 50 percent of the amido groups from said amide being of the structure

where R is selected from the class consisting of hydrogen and saturated lower aliphatic hydrocarbon radicals and $R_1$ is a member selected from the class consisting of hydrogen and lower alkyl radicals; and
   (2) shellac.
2. The resinous composition of claim 1 wherein the carboxylic acid amide is acrylamide.
3. The resinous composition of claim 1 wherein the interpolymer is comprised of acrylamide and styrene.
4. The resinous composition of claim 1 wherein the interpolymer is comprised of acrylamide, ethyl acrylate and styrene.
5. The resinous composition of claim 1 wherein the interpolymer is present in amounts ranging from about 20 percent to about 90 percent.
6. A resinous coating composition comprising
   (1) from about 20 percent to about 90 percent by weight of an interpolymer of (a) from about 2 percent to about 50 percent by weight of acrylamide, and (b) at least one other amide-free monomer containing a $CH_2=C<$ group, said interpolymer being characterized by at least about 50 percent of the amido groups from said acrylamide being of the structure $$-NHCH_2OR_1$$

where $R_1$ is lower alkyl; and
   (2) from about 80 percent to about 10 percent by weight of shellac.
7. The composition of claim 6 wherein said groups represented by $R_1$ are butyl.

References Cited by the Examiner

UNITED STATES PATENTS

| | | | |
|---|---|---|---|
| 2,537,018 | 1/1951 | Barrett | 260—27 |
| 2,870,116 | 1/1959 | Vogel et al. | 260—41 |
| 2,870,117 | 1/1959 | Vogel et al. | 260—41 |
| 2,961,420 | 11/1960 | Frey et al. | 260—27 |
| 2,974,119 | 3/1961 | Schuller et al. | 260—27 |
| 3,037,963 | 6/1962 | Christenson | 260—72 |

OTHER REFERENCES

Chem. Abstracts, vol. 52, No. 7, April 10, 1958, page P6795B.

Chem. Abstracts, vol. 52, No. 17, September 10, 1958, page 15088h.

Chem. Abstracts, vol. 52, No. 22, November 25, 1958, page 21158g.

WILLIAM H. SHORT, *Primary Examiner.*

ALPHONSO D. SULLIVAN, MILTON STERMAN, JOSEPH L. SCHOFER, *Examiners.*